(12) United States Patent
Shikagawa et al.

(10) Patent No.: US 11,210,046 B2
(45) Date of Patent: Dec. 28, 2021

(54) PRINTER, MACHINE LEARNING DEVICE, AND MACHINE LEARNING METHOD

(71) Applicant: SEIKO EPSON CORPORATION, Tokyo (JP)

(72) Inventors: Yuichi Shikagawa, Azumino (JP); Tetsuo Tatsuda, Ina (JP); Haruhisa Kurane, Shiojiri (JP); Mamoru Ukita, Shiojiri (JP); Shigenori Katayama, Okaya (JP); Kazunari Tsukada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/774,535

(22) Filed: Jan. 28, 2020

(65) Prior Publication Data

US 2020/0249892 A1 Aug. 6, 2020

(30) Foreign Application Priority Data

Jan. 31, 2019 (JP) .............................. JP2019-015331

(51) Int. Cl.
*G06F 3/12* (2006.01)
*G06N 20/00* (2019.01)

(52) U.S. Cl.
CPC .......... *G06F 3/1285* (2013.01); *G06F 3/1204* (2013.01); *G06F 3/1205* (2013.01); *G06F 3/1208* (2013.01); *G06N 20/00* (2019.01)

(58) Field of Classification Search
CPC .................................................... G06F 3/1285
USPC ........................................................ 358/1.15
See application file for complete search history.

(56) References Cited

U.S. PATENT DOCUMENTS

| 6,561,643 B1* | 5/2003 | Walker ..................... B41J 2/125 250/559.01 |
| 2002/0156754 A1 | 10/2002 | Swimm |
| 2003/0202214 A1* | 10/2003 | Akita ................... G06K 15/021 358/3.24 |
| 2005/0111015 A1* | 5/2005 | Tsujimoto ............. G06F 3/1204 358/1.9 |
| 2007/0025745 A1 | 2/2007 | Aoki |
| 2014/0192368 A1* | 7/2014 | Endo ..................... G01B 11/06 356/630 |
| 2016/0031250 A1 | 2/2016 | Yokozawa et al. |
| 2016/0243866 A1 | 8/2016 | Yokozawa et al. |

FOREIGN PATENT DOCUMENTS

| CN | 1959380 | 5/2007 |
| CN | 107944504 | 4/2018 |
| JP | 2004-093967 | 3/2004 |
| JP | 2007-055814 | 3/2007 |

(Continued)

*Primary Examiner* — Jacky X Zheng
(74) *Attorney, Agent, or Firm* — Workman Nydegger

(57) ABSTRACT

A printer includes: a memory configured to store a machine-learned model obtained by machine learning using teaching data associating at least one of reflectance of a print medium, transmittance of the print medium, and image data obtained by capturing an image of a surface of the print medium with a type of the print medium; and a print controller configured to determine a type of a print medium using at least one of reflectance of the print medium, transmittance of the print medium, and image data obtained by capturing an image of a surface of the print medium and the machine-learned model.

11 Claims, 5 Drawing Sheets

(56) References Cited

FOREIGN PATENT DOCUMENTS

| | | |
|---|---|---|
| JP | 2011-137938 | 7/2011 |
| JP | 2016-034718 | 3/2016 |
| JP | 2017-173496 | 9/2017 |

\* cited by examiner

PRINTER, MACHINE LEARNING DEVICE, AND MACHINE LEARNING METHOD

The present application is based on, and claims priority from JP Application Serial Number 2019-015331, filed Jan. 31, 2019, the disclosure of which is hereby incorporated by reference herein in its entirety.

BACKGROUND

1. Technical Field

The present disclosure relates to a printer, a machine learning device, and a machine learning method.

2. Related Art

To date, a method is known of determining the type of a print medium based on the physical property value of the print medium. For example, JP-A-2011-137938 discloses a method of determining the type of a print medium based on an amplitude spectrum for each spatial frequency calculated from the image data obtained by reading the surface of the print medium. More specifically, the method is disclosed of determining the type of a print medium by calculating the total number of frequencies having an amplitude spectrum of a certain level or more for each region (DC region, low frequency region, high frequency region) produced by dividing the spatial frequency domain and comparing the total number in each region with a threshold value.

However, when a configuration is employed in which the type of a print medium is determined by comparing the physical property value of a print medium and a threshold value, the determination rate of the print medium deteriorates unless the threshold value is suitable. It is not easy to determine the determination condition, such as a threshold value suitable for each type of the print medium and the like.

SUMMARY

An advantage of some aspects of the present disclosure is that it determines the type of a print medium. According to an aspect of the present disclosure, there is provided a printer including a memory configured to store a machine-learned model obtained by machine learning using teaching data associating at least one of reflectance of a print medium, transmittance of the print medium, and image data obtained by capturing an image of a surface of the print medium with a type of the print medium; and a print controller configured to determine a type of a print medium using at least one of reflectance of the print medium, transmittance of the print medium, and image data obtained by capturing an image of a surface of the print medium and the machine-learned model. It is possible for the printer to determine the type of a print medium based on at least one of reflectance of the print medium, transmittance of the print medium, and the image data. Also, the printer has a configuration in which the type of the print medium is determined using a machine learning model. Accordingly, it is not necessary for a user to determine a determination condition of the type of a print medium, and thus it is possible for the user to easily obtain a determination condition of the type of a medium. Also, when a machine learning model is configured that determines the type of a print medium based on a plurality of physical property values, such as the reflectance of the print medium, the transmittance of the print medium, image data, and the like, it is possible to increase the possibility of correctly determining the type of a print medium.

In the printer described above, the reflectance of the print medium may be spectral reflectance of light emitted from a light source and reflected by a surface of the print medium; and the transmittance of the print medium may be spectral transmittance of the light emitted from the light source and transmitted through the print medium. With this configuration, it is possible to determine the type of a print medium based on at least one of the spectral reflectance (characteristic of the reflectance in accordance with a wavelength) and the spectral transmittance (characteristic of the transmittance in accordance with a wavelength).

In the printer described above, the reflectance of the print medium may be calculated based on the image data obtained by capturing the surface of the print medium in a state of the print medium being irradiated from a light source located on a same side of an imaging section of the print medium; and the transmittance of the print medium may be calculated based on the image data obtained by capturing the surface of the print medium in a state of the print medium being irradiated from a light source located on an opposite side of the imaging section of the print medium. With this configuration, it is possible to determine the type of a print medium based on at least one of the reflectance and the transmittance calculated based on the image data captured by the imaging section.

In the printer described above, at least one of surface roughness and grain of the print medium obtained based on the image data obtained by capturing the surface of the print medium may be associated with the type of the print medium in the teaching data. With this configuration, it is possible to configure a machine learning model for determining the type of a print medium based on at least one of the surface roughness and the grain of the print medium obtained by capturing the image of the print medium.

In the printer described above, the print controller may perform printing using a print parameter in accordance with a determined type of the print medium. By performing printing using a print parameter in accordance with the type of a print medium, it is possible to reduce the possibility of deterioration of the print quality.

According to another aspect of the present disclosure, there is provided a machine learning device including: a teaching data obtaining section configured to obtain teaching data associating at least one of reflectance of a print medium, transmittance of the print medium, and image data obtained by capturing an image of a surface of the print medium with a type of the print medium; and a learning section configured to input at least one of reflectance of the print medium, transmittance of the print medium, and image data obtained by capturing an image of a surface of the print medium and perform machine learning on a model outputting a type of the print medium based on the teaching data. With this configuration, it is possible to obtain a machine learning model that determines the type of a print medium based on at least one of the reflectance of the print medium, the transmittance of the print medium, and the image data.

According to another aspect of the present disclosure, there is provided a machine learning method including: obtaining teaching data associating at least one of reflectance of a print medium, transmittance of the print medium, and image data obtained by capturing an image of a surface of the print medium with a type of the print medium; and inputting at least one of reflectance of the print medium, transmittance of the print medium, and image data obtained by capturing an image of a surface of the print medium and performing machine learning on a model outputting a type of the print medium based on the teaching data. By this method, it is possible to obtain a machine learning model that determines the type of a print medium based on at least one of the reflectance of the print medium, the transmittance of the print medium, and the image data.

According to another aspect of the present disclosure, there is provided a print control program that causes a computer to function as a memory configured to store a machine-learned model obtained by machine learning using teaching data associating at least one of reflectance of a print medium, transmittance of the print medium, and image data obtained by capturing an image of a surface of the print medium with a type of the print medium; and a print controller configured to determine a type of a print medium using at least one of reflectance of the print medium, transmittance of the print medium, and image data obtained by capturing an image of a surface of the print medium and the machine-learned model. By performing this program, it is possible for a computer to determine the type of a print medium based on at least one of the reflectance of the print medium, the transmittance of the print medium, and the image data.

DESCRIPTION OF EXEMPLARY EMBODIMENTS

Figure 1:
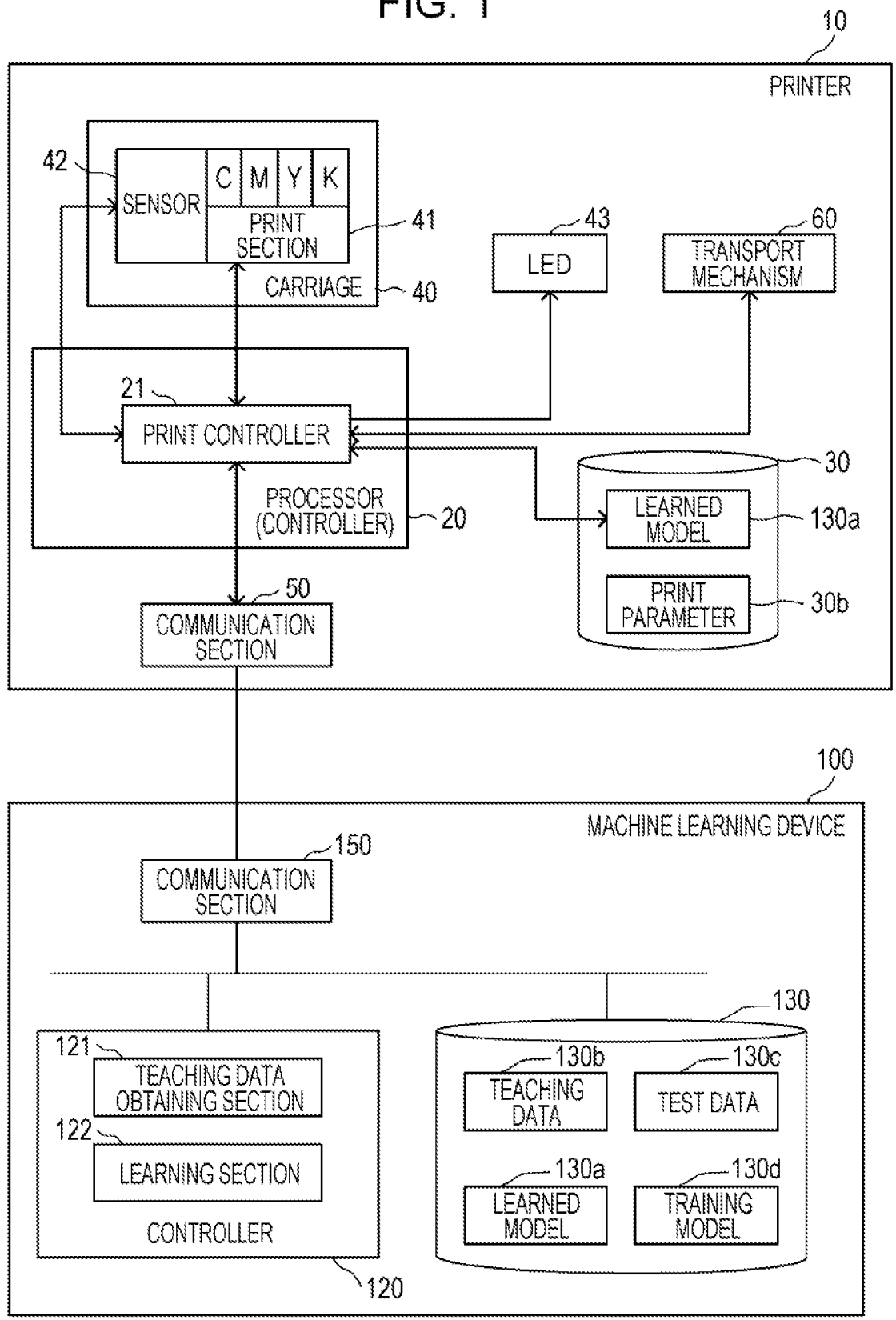
FIG. 1 is a block diagram of a printer and a machine learning device.

Here, a description will be given of embodiments of the present disclosure in the following order.
1. Configuration of Printer
2. Configuration of Machine Learning Device
3. Print Control Processing
4. Other Embodiments 1. Configuration of Printer FIG. 1 is a block diagram illustrating the configuration of a printer 10 that functions as a printer according to an embodiment of the present disclosure. The printer 10 includes a processor 20 including a CPU, a RAM, and the like, and a nonvolatile memory 30. The printer 10 is capable of executing various programs, such as a print control program and the like stored in the nonvolatile memory 30 using the processor 20.

The printer 10 according to the present embodiment is an ink jet printer. The printer 10 includes a carriage 40, a LED 43, a communication section 50, and a transport mechanism 60. The communication section 50 includes various removable memories mounted on the printer 10 and a communication interface circuit for communicating with the other devices connected to the printer 10 in a wired or wireless manner in accordance with various communication protocols. It is possible for the processor 20 to communicate with a machine learning device 100 described later via the communication section 50. Also, it is possible for the processor 20 to obtain data to be printed from a removable memory and the other devices connected via the communication section 50.

The transport mechanism 60 is a device that transports a print medium in a predetermined direction. It is possible for the processor 20 to control the transport mechanism 60 to transport the print medium by a predetermined procedure. A print section 41 and a sensor 42 are mounted on the carriage 40. It is possible for the processor 20 to perform reciprocal movement of the carriage 40 along a specific direction. In the printer 10, the carriage 40 is configured to be moved in the specific direction in a state in which the carriage 40 is held from a predetermined distance from the print medium.

The print section 41 includes print heads that discharge respective four kinds of ink, the CMYK (C: cyan, M: magenta, Y: yellow, K: black) colors, and ink tanks of the corresponding CMYK colors that are attached to the respective print heads. Of course, the ink colors and the number of colors are examples, and ink of the other colors and the other number of colors may be used. A print head includes a discharge nozzle. A plurality of discharge nozzles of the same color are arranged in the direction perpendicular to the movement direction of the carriage 40 to form a nozzle column. The nozzle columns of each color are arranged in the movement direction of the carriage 40. It is possible for the processor 20 to control the ink discharge amount from each discharge nozzle, the discharge timing, and the like.

Accordingly, in the process of moving the carriage 40 in a specific direction, a discharge nozzle discharges each color ink so that it is possible to print an image onto the print medium. By repeating transport of the print medium by the transport mechanism 60, movement of the carriage 40, and discharge of ink from the print head, it is possible to print an image onto any position in the printable range of the print medium. In the present embodiment, the transporting direction of a print medium is referred to as a sub scan direction, and the moving direction of the carriage 40 is referred to as a main scanning direction.

The sensor 42 is a sensor unit that is capable of obtaining the reflectance and the transmittance of the print medium onto which the print section 41 performs printing, and image data. In the embodiment, the sensor 42 is included in the carriage 40 in the state of being adjacent to a discharge head in the print section 41 in the main scanning direction. Accordingly, it is possible for the processor 20 to move the sensor 42 in the main scanning direction by moving the carriage 40. With such a configuration, in the present embodiment, it is possible to bring any position on the print medium in the main scanning direction into view by moving the sensor 42. In the present embodiment, the measurement result by the sensor 42 is used for determining the type of the print medium.

Figure 2:
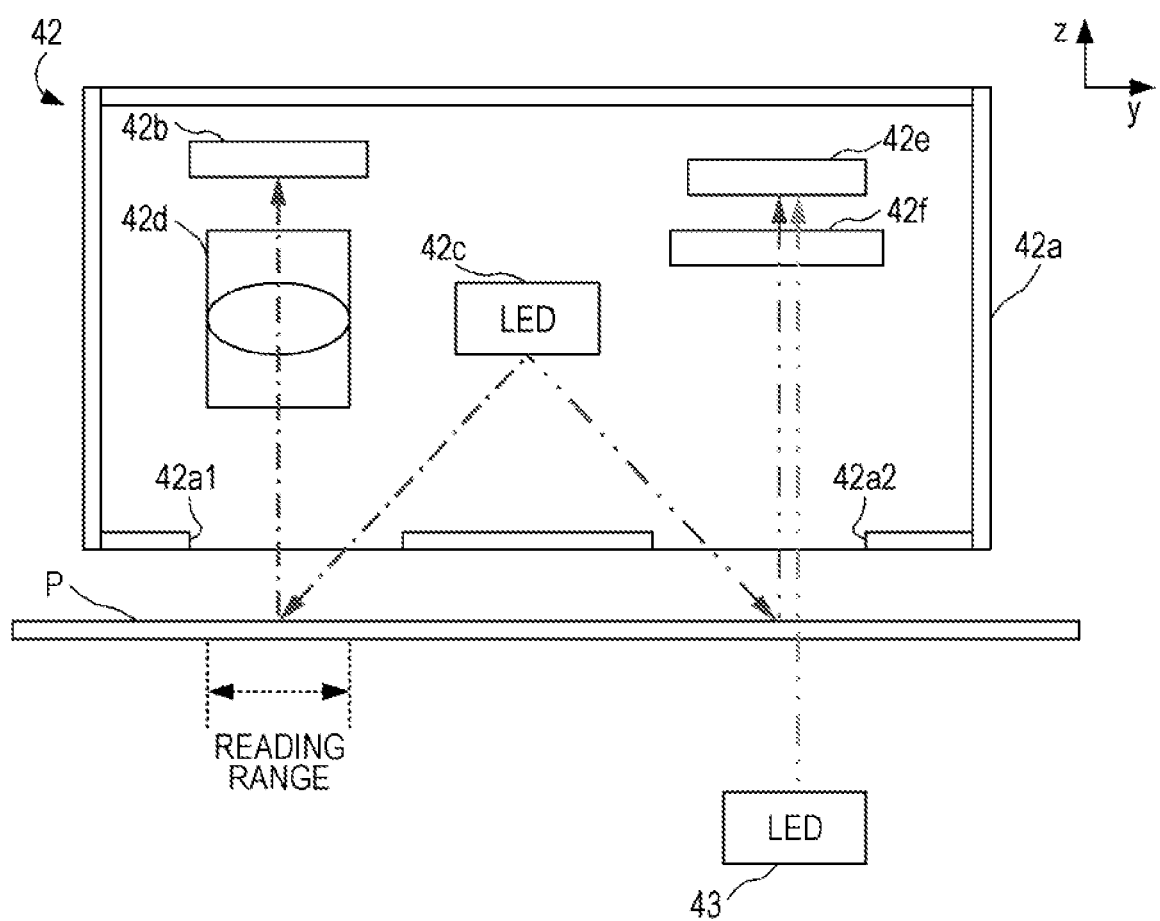
FIG. 2 is a schematic diagram illustrating the configuration for obtaining the reflectance, the transmittance, and the image data of a print medium.

FIG. 2 is a diagram schematically illustrating the structure of the sensor 42. FIG. 2 schematically illustrates the sensor 42 and the print medium P, illustrates the sub scan direction as the y-direction, and illustrates the direction perpendicular to the printing surface as the z-direction. Accordingly, the main scanning direction is the depth direction which is perpendicular to the y-direction and the z-direction. In the present embodiment, the main scanning direction is also referred to as the x-direction.

The sensor 42 according to the present embodiment includes a casing 42a as illustrated in FIG. 2, and a space is formed inside the sensor 42 by the casing 42a. The casing 42a includes an area sensor 42b (imaging section), an LED 42c, a lens 42d, a light reception element 42e, and a spectral separation element 42f in its inside. The area sensor 42b includes sensor elements disposed in a two-dimensional manner. Each of the sensor elements is a sensor that reads the brightness of each color through a filter of a corresponding one of the RGB (R: red, G: green, B: blue) colors and outputs the brightness.

The LED 42c is a light source that emits light onto the print medium. The light output from the LED 42c goes through an opening 42a1 formed on the casing 42a and is reflected by the print medium P. The reflected light goes through the opening 42a1 and the lens 42d and forms an image on the sensor elements of the area sensor 42b. Accordingly, it is possible for the area sensor 42b to read the print medium P irradiated by the LED 42c. In FIG. 2, a part of the light path of the light emitted from the LED 42c and radiated in a reading range of the print medium P and the light path of the light reflected from the print medium P to reach the area sensor 42b through the lens 42d are indicated by a dark gray dash-single dot arrow line. It is possible for the processor 20 to read an image of the surface of the print medium P based on the brightness of each RGB color read by each sensor element of the area sensor 42b. In this manner, the read image of the surface of the print medium P indicates minute irregularities, a pattern, a fiber arrangement, and the like of the surface of the print medium P.

In the present embodiment, the area sensor 42b reads the rectangular reading range of a predetermined size with a predetermined resolution. It is possible for the processor 20 to obtain grayscale values for vertical H pixels×horizontal W pixels for each of the RGB colors as image data.

Also, as indicated by a dark gray dash-double dot arrow line in FIG. 2, the light radiated from the LED 42c goes through an opening 42a2 formed on the casing 42a and is reflected on the surface of the print medium P. The reflected light goes through the opening 42a2 and the spectral separation element 42f, and enters into the light reception element 42e. It is possible for the spectral separation element 42f to change the wavelength of transmission light in accordance with the control signal of the processor 20. The processor 20 measures each of the intensity of the incident light on the light reception element 42e in the state in which the transmission wavelength is changed to a plurality of types (for example, per 10 nm) in the spectral separation element 42f. The processor 20 calculates reflectance based on the ratio between the intensity of the measured light and the intensity of the light radiated from the LED 42c. As described above, it is possible for the processor 20 to obtain spectral reflectance data (data indicating the reflectance in accordance with the wavelength of the light) of the print medium P.

Figure 3:
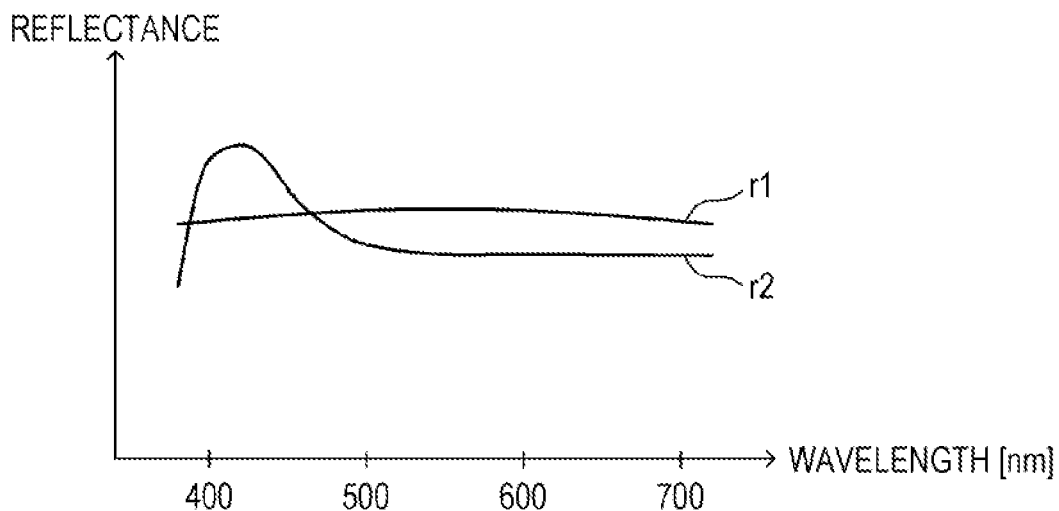
FIG. 3 is a diagram illustrating an example of spectral reflectance characteristics.

FIG. 3 is a graph illustrating an example of spectral reflectance obtained as described above. The characteristic of reflectance differs in accordance with the type of the print medium. White paper on which a fluorescent whitening agent has not been used tends to have little change in reflectance in each wavelength area, for example, as illustrated by r1. On the other hand, white paper on which a fluorescent whitening agent has been used tends to have an increase in reflectance in a short wavelength area, for example, as illustrated by r2. In this manner, the spectral reflectance of the print medium P includes information, such as the color information of the surface of the print medium P, presence or absence of a fluorescent whitening agent, and the like.

As illustrated in FIG. 2, the LED 43 is a light source that radiates light onto the print medium P from the opposite side of the light reception element 42e by sandwiching the print medium P. In the present embodiment, the LED 43 is fixed in the casing of the printer 10. As illustrated by a light gray dash-double dot arrow line in FIG. 2, the light emitted from the LED 43 is transmitted through the print medium P, goes through the opening 42a2 and the spectral separation element 42f, and is received by the light reception element 42e. The processor 20 measures the intensity of the incident light on the light reception element 42e in the state in which the spectral separation element 42f changes the transmission wavelength by a plurality of types (for example, per 10 nm). The processor 20 calculates transmittance based on the ratio between the measured intensity of light and the intensity of light radiated from the LED 43. As described above, it is possible for the processor 20 to obtain the spectral transmittance data (data indicating the transmittance in accordance with the wavelength) of the print medium P. The spectral transmittance of the print medium P includes information related to the thickness and the weight of the print medium P, and the like. The characteristic of transmittance differs depending on the type of the print medium.

In this regard, when the processor 20 measures spectral reflectance of the print medium P, the processor 20 turns on the LED 42c and turns off the LED 43. In this regard, when the processor 20 measures spectral transmittance of the print medium P, the processor 20 moves the carriage 40 to the position where the light emitted from the LED 43 goes through the opening 42a2 and enters into the spectral separation element 42f and the light reception element 42e, turns off the LED 42c and turns on the LED 43, and performs the measurement. In this regard, when the area sensor 42b reads the surface of the print medium P, the processor 20 turns on the LED 42c and turns off the LED 43.

When the machine learning device 100 described later produces a machine learning model for determining the type of the print medium, the printer 10 obtains the above-described image data, spectral reflectance data, and spectral transmittance data for each of a plurality of print mediums to be determined. Hereinafter image data, spectral reflectance data, and spectral transmittance data are referred to as medium data all together. The processor 20 transmits teaching data 130b associating the medium data obtained for each type of the print medium with the type of the print medium to the machine learning device 100 described later via the communication section 50. Also, the processor 20 obtains a machine-learned model 30a generated as a result of machine learning by the machine learning device 100 using the teaching data 130b via the communication section 50 and stores the machine-learned model 30a in the nonvolatile memory 30.

A print controller 21 is a program that causes the processor 20 to perform the function of printing on the print medium. By the function of the print controller 21, the processor 20 controls the sensor 42 and the like to obtain medium data of the print medium before executing printing on the print medium, inputs the medium data into the machine-learned model 130a, and obtains an output result. The processor 20 then determines the type of the print medium based on the output result.

2. Configuration of Machine Learning Device

Next, a description will be given of the configuration of the machine learning device 100 with reference to FIG. 1. The machine learning device 100 is a computer that performs machine learning based on teaching data 130b collected from the printer 10 and outputs a machine-learned model 130*a* as a result of the machine learning to the printer 10. In this regard, the machine learning device 100 may collect the teaching data 130*b* from a plurality of printers and may distribute the machine-learned model 130*a* to a plurality of printers. The machine learning device 100 includes a controller 120 including a CPU, a RAM, and a ROM, a recording medium 130, and a communication section 150. Of course, a GPU or various processors designed for machine learning may be used for the machine learning.

It is possible for the controller 120 to perform the functions related to the machine learning by executing a machine learning program, not illustrated in the figure, recorded in the recording medium 130 to function as a teaching data obtaining section 121 and a learning section 122.

It is possible for the controller 120 to perform a function of obtaining the teaching data 130*b* by the function of the teaching data obtaining section 121. The teaching data 130*b* is transmitted from the printer 10 to the machine learning device 100. In the present embodiment, the teaching data 130*b* obtained by the machine learning device 100 from the printer 10 is the data produced by associating the medium data of the print medium with the type of the print medium. When the controller 120 receives the teaching data 130*b* from the printer 10, the controller 120 stores the teaching data 130*b* in the recording medium 130. When the teaching data 130*b* of a specified amount is stored, it is possible to generate a model for determining the type of a print medium by machine learning from the medium data of the print medium.

Figure 4:
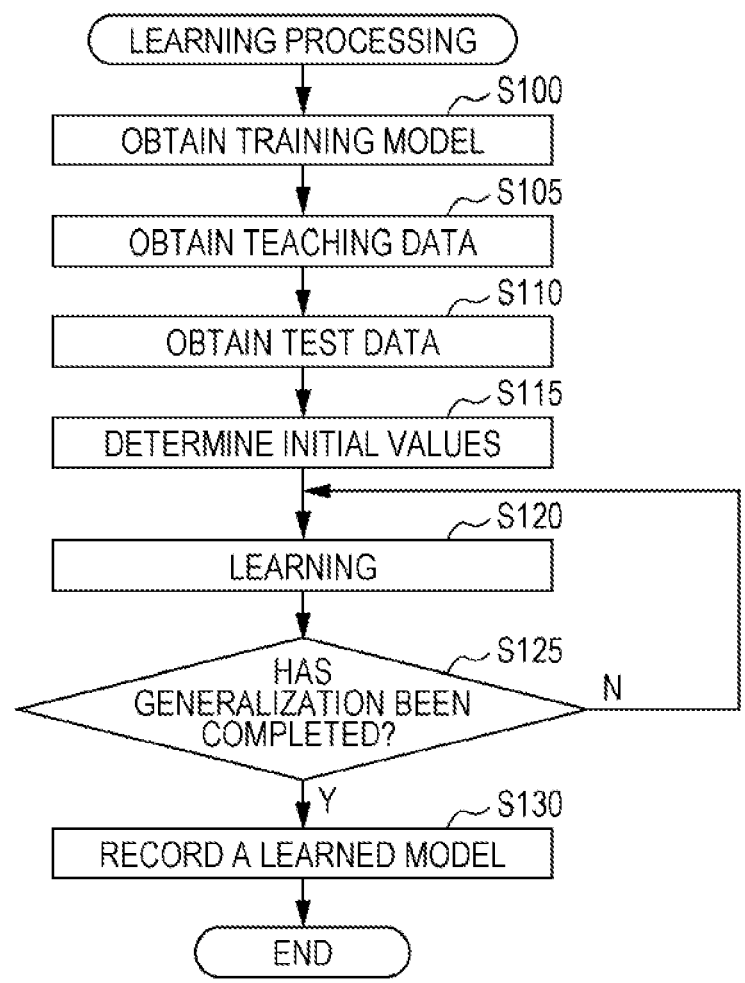
FIG. 4 is a flowchart of machine learning processing.

FIG. 4 is a flowchart illustrating machine learning processing. The machine learning processing may be performed at any timing after a specified amount of the teaching data 130*b* is stored. When the machine learning processing is started, the controller 120 obtains a training model 130*d* by the function of the learning section 122 (step S100). Here, a model refers to information indicating an expression that derives the corresponding relationship between the data to be estimated and the data of an estimation result. In the present embodiment, as an example, a description will be given of a model in which data to be estimated is the medium data of the print medium, and the type of the print medium is the data of an estimation result.

Figure 5:
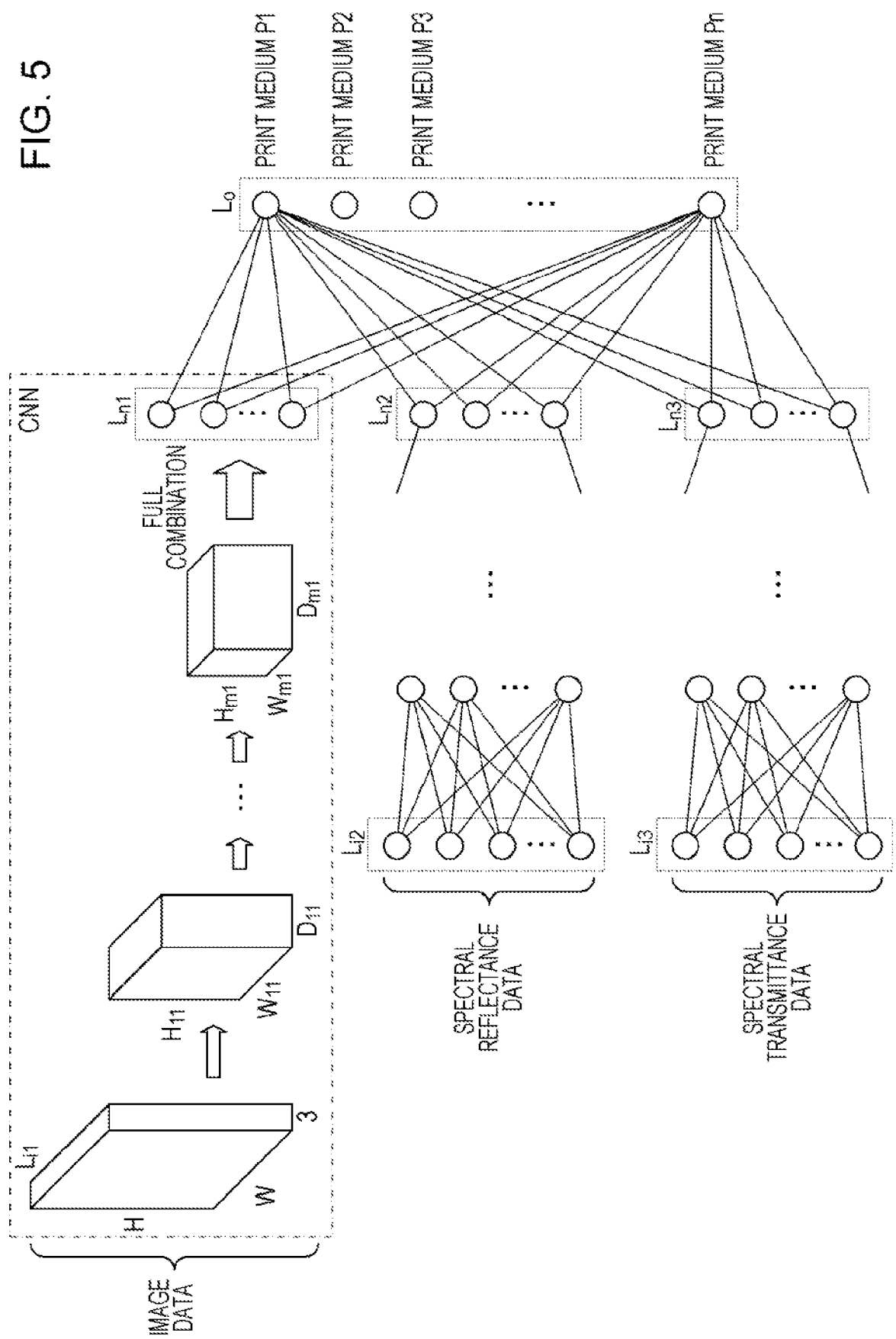
FIG. 5 is a diagram illustrating input and output of a machine learning model.

As long as a model converts input data into output data, it is possible to give various definitions to the model. FIG. 5 is a diagram schematically illustrating an example of a model used in the present embodiment. In the present embodiment, a CNN (convolutional neural network) is used for the image data obtained by capturing the image of the surface of the print medium. In FIG. 5, a change in the data format by CNN is denoted by a cuboid, and a node in a normal neural network is denoted by a white circle.

In the model according to the present embodiment, the image data obtained by capturing the image of the surface of the print medium is used as input data to the input layer $L_{i1}$ of CNN, and the layer $L_{n1}$ outputs intermediate output data on the image data. The image data input to CNN has vertical H pixels and horizontal W pixels, and the grayscale values of three channels, R: red, G: green, and B: blue, are specified for each pixel. Accordingly, in FIG. 5, the image of an input layer $L_{i1}$ is schematically illustrated image by a cuboid having a vertical H, horizontal W, and depth 3. FIG. 5 illustrates an example in which after the image is input to the input layer, the image goes through CNN, that is to say, the image is subjected to convolution operation by a predetermined number of filters having predetermined sizes, operations by an activation function, and operation by a pooling layer, and is converted into $H_{11} \times W_{11} \times D_{11}$ output values. In FIG. 5, an example is illustrated in which conversion is performed by going through a plurality of layers (omitted in FIG. 5) after this, and $H_{m1} \times W_{m1} \times D_{m1}$ output values are produced. After the $H_{m1} \times W_{m1} \times D_{m1}$ output values are obtained by CNN, output values indicating the intermediate output data on the image data are obtained in the layer $L_{n1}$ by full connection.

Also, the model according to the present embodiment is provided with a node for inputting reflectance for each fixed wavelength. In the present embodiment, spectral reflectance for each fixed wavelength indicated by the spectral reflectance data is used as input data to each node of the input layer $L_{i2}$, and the layer $L_{n2}$ outputs intermediate output data on the spectral reflectance data. In this regard, the reflectance is a value between 0 and 1 inclusive. Also, the model according to the present embodiment is provided with a node for inputting transmittance for each fixed wavelength. In the present embodiment, spectral transmittance for each fixed wavelength indicated by the spectral transmittance data is used as input data to each node of the input layer $L_{i3}$, and the layer $L_{n3}$ outputs intermediate output data on the spectral transmittance data. The transmittance is a value between 0 and 1 inclusive. Each node of the output layer $L_o$ receives the output values of each node of layers $L_{n1}$, $L_{n2}$, and $L_{n3}$ as input. Each node of the output layer $L_o$ corresponds to the type (P1, P2, P3, . . . Pn) of the print medium to be determined. The output values of the individual nodes of the output layer $L_o$ are normalized to be totaled 1. In this regard, multiple layers may be provided between the layers $L_{n1}$, $L_{n2}$ and $L_{n3}$, and the output layer $L_o$. It is possible to estimate the type of the print medium corresponding to a node having the highest output value in the output layer $L_o$ to be the type of the print medium of which each data input to the input layers $L_{i1}$ to $L_{i3}$ is obtained.

In step S100 in the flowchart illustrated in FIG. 4, a training model is obtained. Here, training refers to a learning target. That is to say, in a training model, the medium data of the print medium is input, and the type of the print medium is output. However, a corresponding relationship between the medium data described above and the type of the print medium is not correct in the initial stage. That is to say, in the training model, it is possible to determine the number of layers included in a node and the number of nodes. However, the parameters (weight, bias, and the like) that specify the input and output relationship have not been optimized. These parameters are optimized in the process of machine learning (that is to say, are trained).

A training model may be determined in advance or may be obtained by operating a UI section (not illustrated in the figure) provided with the machine learning device 100 by an operator who operates the machine learning device 100. In either case, as illustrated in FIG. 5, the controller 120 obtains as a training model the parameters of the neural network that output the type of the print medium based on the above-described medium data of the print medium.

Next, the controller 120 obtains teaching data by the function of the learning section 122 (step S105). In the present embodiment, as described above, teaching data 130*b* is transmitted to the printer 10 in advance and is recorded on the recording medium 130. Thus, the controller 120 refers to the recording medium 130 to obtain the teaching data 130*b*. Next, the controller 120 obtains test data by the function of the learning section 122 (step S110). In the present embodiment, part of the teaching data 130*b* is extracted from the teaching data 130*b* to be used as test data. The test data is not used for training.

Next, the controller 120 determines initial values by the function of the learning section 122 (step S115). That is to say, the controller 120 gives initial values of the variable parameters to the training model obtained in step S100. The initial values may be determined by various methods. For example, random values, 0, or the like may be used as initial values, and the initial values may be determined based on a different idea of a weight and a bias. Of course, initial values may be adjusted such that the parameters are optimized in the learning process.

Next, the controller 120 performs learning by the function of the learning section 122 (step S120). That is to say, the controller 120 inputs the medium data in the teaching data 130*b* obtained in the step S105 into the training model obtained by step S100 and calculates the output values of the output layer $L_o$. Also, the controller 120 identifies an error by a loss function that indicates an error between the type of the output print medium and the type of the print medium indicated by the teaching data 130*b*. The controller 120 then repeats update processing of the parameters based on the derivation of the loss function by the parameters a specified number of times. For example, when teaching data is provided that associates the medium data of the print medium (P1) with the print medium (P1), the parameters are updated so that the output (P1, P2, P3, . . . Pn) obtained by inputting the medium data of the print medium (P1) into the model come close to (1, 0, 0, . . . 0).

Of course, it is possible to apply various functions to the loss function. For example, it is possible to apply a cross entropy error or the like. The processing for calculating the loss function as described above is performed on all of or a part of the image included in the teaching data 130*b*, and the loss function in one-time learning is expressed by its average and total. When the loss function in one-time learning is obtained, the controller 120 updates the parameters by a specified optimization algorithm, for example, stochastic gradient descent.

As described above, after the parameters are updated for a specified number of times, the controller 120 determines whether or not generalization of a training model has been completed (step S125). That is to say, the controller 120 obtains output indicating the setting by inputting the image data indicated by the test data obtained in step S110 into the training model. The controller 120 then obtains the matching degree of the output setting and the setting associated with the test data. In the present embodiment, when the matching degree is equal to or higher than a threshold value, the controller 120 determines that the generalization has been completed.

In this regard, in addition to the evaluation of generalization performance, the validity of hyperparameter may be verified. That is to say, in the configuration in which hyperparameters, which are the variable amounts other than weight and bias, for example, the number of nodes and the like are tuned, the controller 120 may verify the validity of the hyperparameter based on the verification data. The verification data may be extracted from the teaching data by the same processing as that in step S110. Of course, the verification data is not used for training in the same manner as the test data.

In step S125, when the controller 120 determines that the generalization of a training model has not been completed, the controller 120 repeats the processing of step S120. That is to say, the controller 120 further updates the weight and the bias. On the other hand, in step S125, when the controller 120 determines that the generalization of a training model has been completed, the controller 120 records a machine-learned model (step S130). That is to say, the controller 120 records a training model in the recording medium 130 as the machine-learned model 130*a*. The controller 120 then transmits the machine-learned model 130*a* to the printer 10 via the communication section 150.

With the configuration described above, it is possible to produce a model (machine-learned model 130*a*) for determining the type of the print medium onto which the printer 10 performs printing.

3. Print Control Processing

Figure 6:
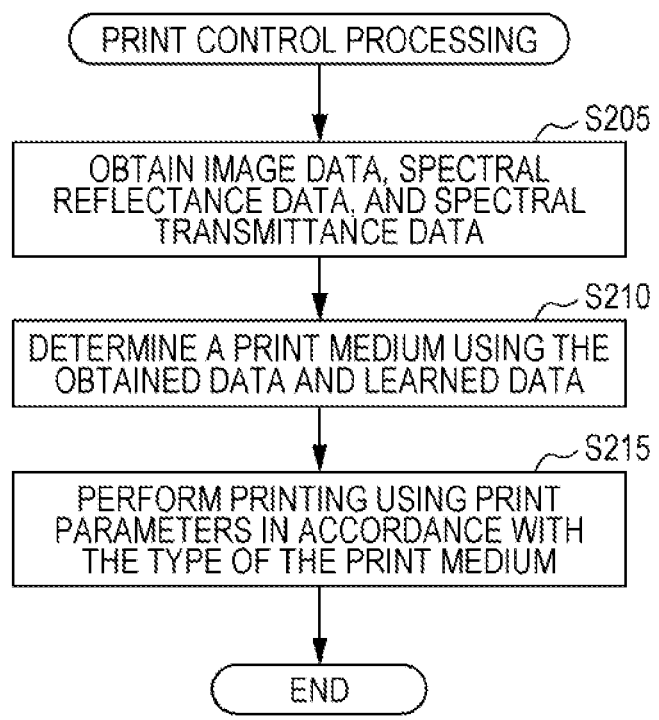
FIG. 6 is a flowchart of print control processing.

Next, a description will be given of print control processing performed by the printer 10. FIG. 6 is a flowchart of the print control processing by the processor 20 using the function of the print controller 21. In the present embodiment, it is assumed that the print medium is a type of rolled paper. The print control processing in FIG. 6 is performed when a user instructs to execute printing in a state in which rolled paper is set in the printer 10 (state in which the print medium has come into view of the sensor 42). In this regard, it is assumed that the machine-learned model 130*a* produced from the machine learning device 100 as described above is stored in the nonvolatile memory 30.

When the print control processing is started, the processor 20 obtains image data, spectral reflectance data, and spectral transmittance data (step S205). That is to say, the processor 20 causes the area sensor 42*b* to capture the image of the surface of the print medium P in the state in which the LED 42*c* is turned on, and the LED 43 is turned off, and obtains image data of the surface. Also, the processor 20 measures the intensity of light of each wavelength to obtain reflectance by changing the transmission wavelength in the spectral separation element 42*f* in the state in which the LED 42*c* is turned on, and the LED 43 is turned off. Also, the processor 20 measures the intensity of light of each wavelength to obtain transmittance by changing the transmission wavelength in the spectral separation element 42*f* in the state in which the LED 42*c* is turned off, and the LED 43 is turned on.

Next, the processor 20 determines the type of the print medium using each data and the machine-learned model 130*a* obtained in step S205 (step S210). That is to say, the processor 20 inputs the obtained each data to the machine-learned model 130*a* to obtain an output value. The processor 20 determines the type of the print medium based on the output value of the machine-learned model 130*a*. For example, when the output values (P1, P2, P3, . . . Pn) obtained from the output layer $L_o$ of the model are (0.9, 0.01, 0.01, . . . 0.005), the processor 20 determines that the type of the set print medium is P1.

Next, the processor 20 executes printing using the print parameters in accordance with the type of the print medium determined in step S210 (step S215). The print parameter 30*b* may assume, for example, an ink discharge amount, heater temperature for drying ink, transport parameters on each part of the transport mechanism 60 (for example, parameters on the medium tension), and the like.

The processor 20 obtains data to be printed via the communication section 50 and converts the data to print data in the format suitable for printing by the printer 10 and optimized in accordance with the type of the print medium. At this time, the data is converted to have an ink discharge amount in accordance with the type of the print medium. Also, the processor 20 causes the print section 41 to discharge ink droplets onto the print medium while transporting the print medium using the transport parameters in accordance with the type of the print medium and dries the ink on the print medium with heater temperature in accordance with the type of the print medium. In this manner, with the present embodiment, it is possible to reduce the possibility of deteriorating the print quality by performing printing using the print parameters in accordance with the type of the print medium.

4. Other Embodiments

The embodiments described above are examples for carrying out the present disclosure. It is possible to employ various other embodiments as long as the type of the print medium is determined using a machine-learned model produced by performing machine learning by using the teaching data associating at least one of reflectance of the print medium, transmittance of the print medium, and the image data of the image captured of the surface of the print medium with the type of the print medium, and at least a corresponding one of the elements described above. For example, the present disclosure may be applied to the case where a complex machine having a print function and an image reading function performs copying (reading the document and printing the image of the document onto the print medium).

Also, for example, the printer 10 may be provided with the teaching data obtaining section 121 and the learning section 122. That is to say, the printer may serve as a machine learning device. Also, the print medium may be in any form, such as rolled paper, cut paper, and the like. The print medium may be paper or a material other than paper.

It is desirable that the sensor 42 be able to obtain each data before ink is discharged onto the print medium P in the printer 10. The sensor 42 may be or may not be mounted on the carriage 40. The sensor 42 may be disposed upstream of the carriage 40 in the transport path of the print medium. The LED for measuring transmittance may be fixed to the casing of the printer, or, for example, may be disposed in a movable manner in the main scanning direction.

In this regard, the printing method of the printer is not limited to an ink jet method. The other methods, such as an electrophotographic method may be used. The print parameters may be assumed to be various types in accordance with the printing method. The spectral reflectance and the spectral transmittance may be measured within the visible light wavelength range or may be measured in the invisible light wavelength range.

Further, reflectance of the print medium may be calculated based on the image data obtained by capturing the image of the surface of the print medium in the state in which a light source located on the same side of the imaging section with respect to the print medium radiates the print medium. That is to say, reflectance of the print medium may be calculated based on the grayscale value of each pixel of the image data. For example, the individual average value may be calculated from the grayscale values obtained from the entire imaging range of the area sensor 42b or a specific area thereof, and reflectance of the print medium may be calculated based on the ratio between the average value and the grayscale values corresponding to the light radiated by the LED 42c. The reflectance may be calculated for each RGB color or may be calculated for a specific color.

Also, transmittance of the print medium may be calculated based on the image data obtained by capturing the image of the surface of the print medium in the state in which a light source located on the opposite side of the imaging section with respect to the print medium radiates the print medium. That is to say, transmittance of the print medium may be calculated based on the grayscale value of each pixel of the image data. For example, the area sensor 42b may capture the image of the print medium P in the state in which the carriage 40 is moved such that the light emitted from the LED 43 directly goes through the lens 42d and enters onto the area sensor 42b. The individual average value may be calculated from the grayscale values obtained from the entire imaging range of the area sensor 42b or a specific area thereof, and transmittance of the print medium may be calculated based on the ratio between the average value and the grayscale values corresponding to the light radiated by the LED 43. The transmittance may be calculated for each RGB color or may be calculated for a specific color.

The teaching data may have a structure in which at least one of the surface roughness of the print medium and the grain of the print medium, which are obtained based on the image data of the image captured of the surface of the print medium is associated with the type of the print medium. The image data of the surface of the print medium includes an image of minute irregularities indicating the fiber arrangement of the paper. It is possible to derive frequency components of the irregularities in the x-direction of the print medium surface and frequency components of the irregularities in the y-direction of the print medium surface by the Fourier transform using the pixel values of the image data. Further, it is possible to derive an area having frequency components in the x-direction and frequency components in the y-direction that are higher than the respective specified values (for example, a low frequency region, a medium frequency region, a high frequency region, and the like). The area in the x-direction and the y-direction is data indicating the roughness of the surface of the print medium. Also, it is possible to derive the grain (long grain or short grain) of the print medium from the differences between the frequency domain in the x-direction and the frequency domain in the y-direction. The teaching data may include data indicating the surface roughness of the print medium and the data indicating the grain, which are derived in this manner. The grain may be adopted as input data to the model or the output data of the model. In the latter case, the output node of the model may be provided for each type of the print medium and grain, for example, P1 (long grain), P1 (short grain), P2 (long grain), P2 (short grain), and the like.

Further, it is possible to apply the above-described method as a program or a method (machine learning method). As described in the present disclosure, a machine-learned model is produced by performing machine learning using teaching data associating at least one of the reflectance of a print medium, the transmittance of the print medium, and the image data obtained by capturing the image of the surface of the print medium with the type of the medium, and determining the type of the print medium using a machine-learned model and at least one of the elements described above. Also, the above-described system, program, and method may be realized in various modes, for example, as a single device, or may be used as a part of a system including a plurality of devices. Also, it is possible to suitably realize a part of the system as software, a part of the system as hardware, and the like. Further, the present disclosure is realized as a recording medium storing a program that controls the system. Of course, the recording medium of the program may be a magnetic recording medium, a semiconductor memory, or may be considered to be any recording medium that will be produced by future development exactly in the same manner.

What is claimed is:

1. A printer comprising:
a memory configured to store a machine-learned convolutional neural network (CNN) model obtained by machine learning CNN using teaching data including information related to a thickness and a weight of a print medium, and image data obtained by capturing an image of a surface of the print medium associated with a type of the print medium; and
a print controller configured to determine a type of a print medium using information related to a thickness and a weight of a print medium, and image data obtained by capturing an image of a surface of the print medium and the machine-learned CNN model.

2. The printer according to claim 1, wherein:
the teaching data further includes information related to a reflectance of the print medium and a transmittance of the print medium associated with the type of the print medium;
the reflectance of the print medium is spectral reflectance of light emitted from a light source and reflected by a surface of the print medium; and
the transmittance of the print medium is spectral transmittance of the light emitted from the light source and transmitted through the print medium.

3. The printer according to claim 1, wherein:
the teaching data further includes information related to a reflectance of the print medium and a transmittance of the print medium associated with the type of the print medium;
the reflectance of the print medium is calculated based on the image data obtained by capturing the surface of the print medium in a state of the print medium being irradiated from a light source located on a same side of an imaging section of the print medium; and
the transmittance of the print medium is calculated based on the image data obtained by capturing the surface of the print medium in a state of the print medium being irradiated from a light source located on an opposite side of the imaging section of the print medium.

4. The printer according to claim 1, wherein
at least one of surface roughness and grain of the print medium obtained based on the image data obtained by capturing the surface of the print medium is associated with the type of the print medium in the teaching data.

5. The printer according to claim 1, wherein
the print controller performs printing using a print parameter in accordance with a determined type of the print medium.

6. The printer according to claim 1, wherein the information related to the thickness and the weight of the print medium is measured by spectral transmittance of the print medium.

7. The printer according to claim 1, wherein:
the memory configured to store a machine-learned model obtained by machine learning using teaching data that includes reflectance of a print medium, and
the print controller is configured to determine a type of a print medium using reflectance of the print medium.

8. A machine learning device comprising:
a teaching data obtaining section configured to obtain teaching data including information related to a thickness and a weight of a print medium, and image data obtained by capturing an image of a surface of the print medium associated with a type of the print medium; and
a learning section providing a convolutional neural network (CNN) configured to input at least one of the thickness and the weight of the print medium, and image data obtained by capturing an image of a surface of the print medium and perform machine learning on a model outputting a type of the print medium based on the teaching data.

9. The machine learning device of claim 8, wherein the information related to the thickness and the weight of the print medium is measured by spectral transmittance of the print medium.

10. A machine learning method comprising:
obtaining teaching data including information related to a thickness and a weight of a print medium, and image data obtained by capturing an image of a surface of the print medium associated with a type of the print medium; and
inputting at least one of the thickness and the weight of the print medium, and image data obtained by capturing an image of a surface of the print medium and performing machine learning via a convolutional neural network (CNN) to learn a CNN model outputting a type of the print medium based on the teaching data.

11. The machine learning method of claim 10, wherein the information related to the thickness and the weight of the print medium is measured by spectral transmittance of the print medium.

* * * * *